Figure 1:
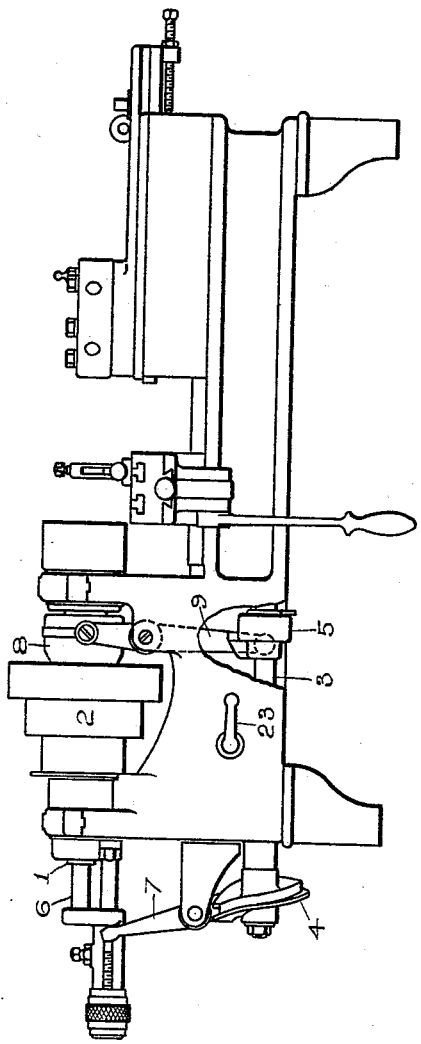

(No Model.)  3 Sheets—Sheet 1.

S. L. WORSLEY.
METAL SCREW MACHINE.

No. 543,606.  Patented July 30, 1895.

Witnesses:
S. J. Murphy.
John Renshaw.

Inventor.
Samuel L. Worsley
by Wilmarth H. Thurston,
Atty.

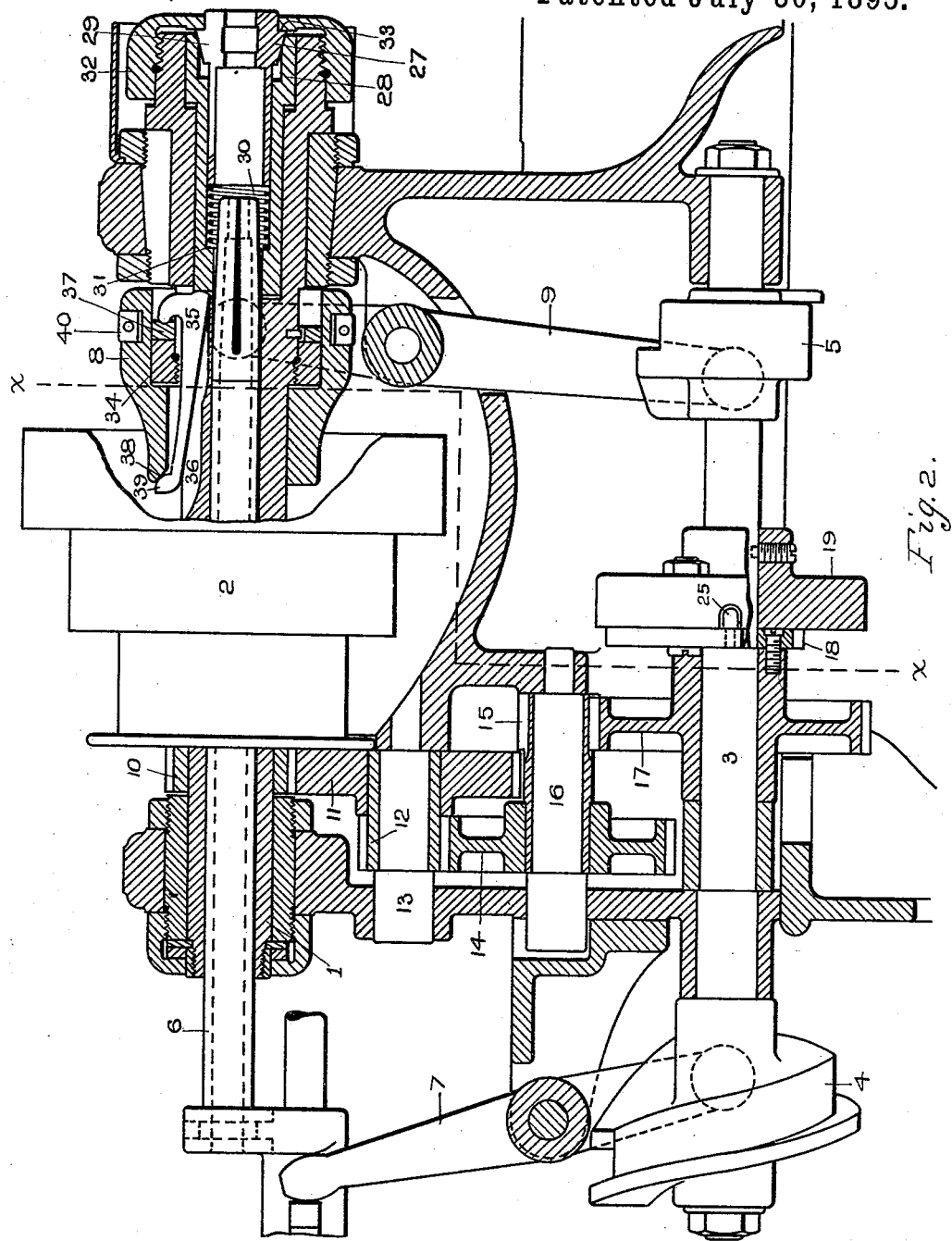

(No Model.) 3 Sheets—Sheet 3.
S. L. WORSLEY.
METAL SCREW MACHINE.
No. 543,606. Patented July 30, 1895.
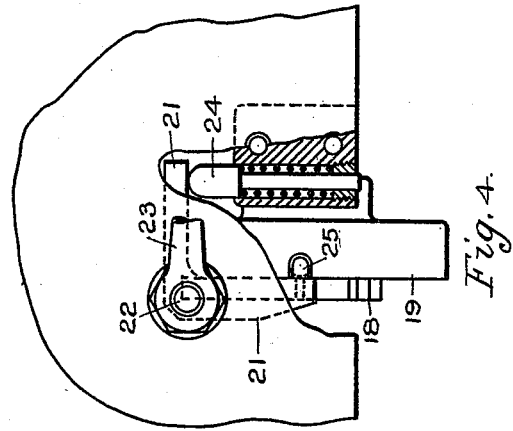
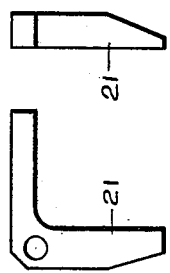
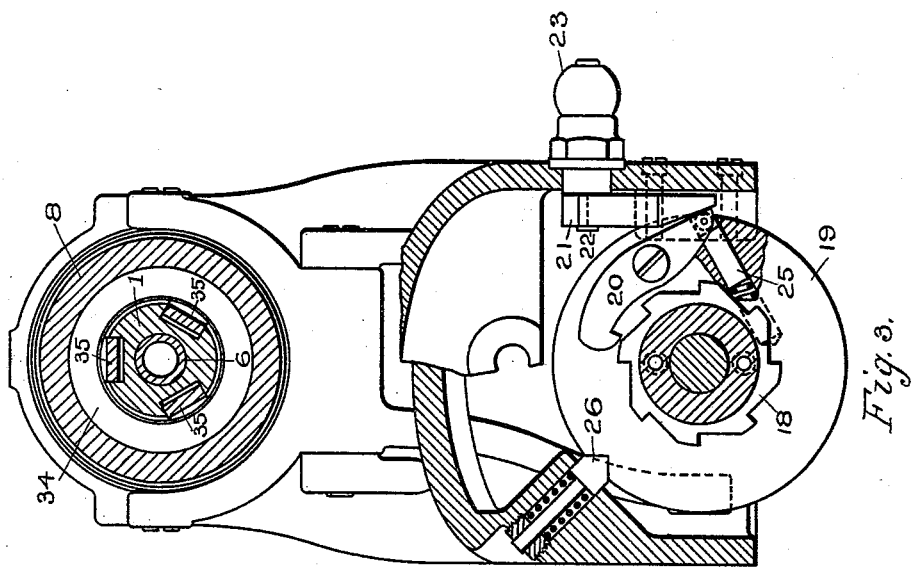
Witnesses:
Inventor.
Samuel L. Worsley,
by Wilmarth H. Thurston,
Atty.

UNITED STATES PATENT OFFICE.

SAMUEL L. WORSLEY, OF TAUNTON, MASSACHUSETTS, ASSIGNOR TO THE BROWN & SHARPE MANUFACTURING COMPANY, OF PROVIDENCE, RHODE ISLAND.

METAL-SCREW MACHINE.

SPECIFICATION forming part of Letters Patent No. 543,606, dated July 30, 1895.

Application filed June 20, 1894. Serial No. 515,126. (No model.)

*To all whom it may concern:*

Be it known that I, SAMUEL L. WORSLEY, of Taunton, in the county of Bristol and State of Massachusetts, have invented certain new and useful Improvements in Metal-Screw Machines; and I do hereby declare the following specification, taken in connection with the accompanying drawings, forming a part of the same, to be a full, clear, and exact description thereof.

The present invention relates to that class of metal-screw machines in which a rod of stock is intermittently fed forward for the prescribed distance required to make a screw of given length, and is held in the jaws of a revolving chuck with a sufficient length of the same projecting beyond the face of such chuck to be operated upon by a series of tools mounted in a turret-head.

In the machine shown and described in Letters Patent No. 424,527, heretofore granted to me, a cam-shaft was employed provided with appropriate cams for releasing the gripping-jaws in the chuck, for feeding forward the rod of stock, for closing said gripping-jaws, and for moving back the feeding devices for taking a new grip upon the rod of stock, to which cam-shaft an intermittent rotary motion was given by alternately connecting it with, and disconnecting it from, the prime-motor shaft of the machine, both the connection and disconnection being automatically effected. In the machine of said prior patent, which was an entirely automatic machine, the prime-motor shaft referred to was entirely independent of the chuck-carrying spindle and was driven by a separate belt, and consequently the cams for actuating the gripping-jaws of the chuck and the feeding devices were operated entirely independent of the chuck-carrying spindle. In machines which are not thus thoroughly automatic, and in which more or less of the operations are performed by hand, it is still desirable to have the gripping-jaws and the feeding mechanism automatically operated to a certain extent, and the object of the present invention is to provide such a machine with suitable mechanism for accomplishing this result.

To that end the first feature of invention consists in the combination, with the chuck-carrying spindle, of a cam-shaft provided with suitable cams for actuating the jaws of the chuck to grip and release the rod of stock and for operating the feeding devices at the proper times, and mechanism for operating said cam-shaft direct from said chuck-carrying spindle. As it is not desired that said cam-shaft should be operated continuously, but only intermittently, the invention further consists, in combination with the parts above referred to, of means for connecting said cam-shaft with, and disconnecting it from, the chuck-carrying spindle at the proper times.

As the chuck-carrying spindle does not rotate continuously in one direction, but is instead alternately rotated first in one direction and then in the other, and as the period of its rotation in either direction is not automatically determined or controlled, but is instead determined and controlled by the operator, it is not desirable to have the cam-shaft referred to connected with the chuck-carrying spindle and set into operation automatically, and consequently a further feature of invention consists in providing means whereby said cam-shaft may be readily connected with said chuck-carrying spindle and thus set into operation by hand and disconnected therefrom and thrown out of operation automatically.

Heretofore in machines of this character, in which a chuck containing gripping-jaws provided with inclined outer faces in combination with a surrounding conical sleeve was employed, it has been customary to actuate said jaws to grip the rod of stock by moving the chuck itself longitudinally with relation to said inclosing-sleeve. This method of operating said gripping-jaws is attended with certain objections and disadvantages. One serious objection to such arrangement is the fact that it results in more or less irregularity in the feed of the rod of stock, rendering it practically impossible to produce screws or to cut off pieces from the rod which shall be of exactly uniform length without the employment of a fixed stop to limit the movement of the rod under the action of the feeding devices. The rods of stock, even when designed to be of a certain given size, are seldom of exactly the same diameter, but necessarily vary more or less. Consequently when the jaws of the chuck are operated by a longitudinal movement of the chuck itself, if the rod inserted in the chuck happens to be slightly larger in diameter than the standard size for which the parts are constructed or adjusted, the jaws will grip the rod prematurely and the continued longitudinal movement of the chuck will cause the rod to be moved or fed more or less by the chuck itself and independent of the feeding devices, thereby causing the blank or piece subsequently severed from said rod to be of greater length than desired and of a greater length than that for which the feeding devices had been adjusted. As the amount of feed thus imparted to the rod by the longitudinal movement of the chuck will depend upon the time when the rod is gripped by the jaws of the chuck, and as this in turn will depend upon the relative diameter of different rods, it follows that every different diameter of rod above the standard will be attended by a corresponding difference in the length of the piece or blank severed from said rod, and that there will consequently be as many variations in the amount of feed and in the length of blank as there are variations in the diameters of the rods, resulting in a great irregularity of feed and in the formation of blanks of unequal and varying length. If a fixed stop be employed to limit the forward movement of the rod, such stop is liable to cause a slipping of the feeding-fingers upon the rod and consequent loss of time, and whenever the jaws of the chuck are caused to firmly grip the rod before the completion of the longitudinal movement of the chuck, as will be the case when the rod is materially larger in diameter than the standard provided for, the employment of such fixed stop is further liable to cause damage and injury to the parts. The use of such a stop is therefore objectionable.

To overcome all of the objections referred to and to secure a uniform feed and the production of blanks or pieces of exactly equal length is therefore a further object of the present invention. This result is secured by a novel combination and arrangement of parts whereby the jaws of the chuck are actuated to grip and release the rod of stock by a longitudinal movement of the inclosing-sleeve with relation to the chuck, instead of vice versa, as heretofore.

Referring to the drawings, Figure 1 is a front elevation of a machine embodying the invention, a portion of the frame being broken away. Fig. 2 is a central vertical section of the spindle end of the machine upon an enlarged scale. Fig. 3 is a section on the line $x\ x$ of Fig. 2 with a portion of the disk broken away. Fig. 4 is a front elevation upon an enlarged scale of a portion of the machine, partly in section; and Figs. 5 and 6 are a side view and an end view respectively of the pawl-retaining lever.

The construction of the turret end of the machine is the same as heretofore, and will require no description in this connection.

The construction of the spindle end of the machine is most clearly represented in Fig. 2.

The chuck-carrying hollow spindle 1, having the cone-pulley 2 secured thereto, is journaled in the frame in the usual, or in any suitable manner.

3 is the cam-shaft, which is likewise journaled in suitable bearings in the frame. Secured to said cam-shaft are two cams 4 and 5, for actuating the feeding devices and the gripping-jaws of the chuck, respectively.

The cam 4 actuates the feeding-tube 6 (which tube and the feeding-fingers connected thereto are of common construction and need no special description) through the lever 7, pivoted to the frame and suitable connecting devices. If desired the connecting devices shown and described in my said Patent No. 424,527 may be employed, thereby providing means for adjusting and regulating the feed without stopping the machine, and any other forms of feeding devices may be substituted for those shown. The cam 5 acts upon the sliding sleeve 8 for actuating the gripping-jaws of the chuck through the lever 9, likewise pivoted to the frame.

The mechanism shown in the drawings for actuating the cam-shaft 3 directly from the chuck-carrying spindle 1 is as follows: Secured to the spindle 1 is a pinion 10, which meshes with a gear 11, secured to the hub of a pinion 12, mounted upon a stud 13, secured to the frame, which said pinion 12 in turn meshes with a gear 14, secured to the hub of a pinion 15, mounted upon the stud 16, secured to the frame, which said pinion 15 in turn meshes with a gear 17, loosely mounted upon the cam-shaft 3, which said gear 17 is thus constantly rotated when the spindle 1 is in motion. The arrangement of said gearing is such as to materially reduce the speed of the gear 17 as compared with that of the spindle 1. Secured to the hub of the gear 17 is a ratchet-wheel 18, which consequently rotates with said gear. Secured to the cam-shaft 3 at one side of the ratchet-wheel 18, and adjacent thereto, is a disk 19, carrying a pivoted pawl 20, adapted to engage the teeth of said ratchet-wheel. This pawl 20 is normally kept out of engagement with said ratchet-wheel by means of a bell-crank lever 21, secured to the inner end of a short shaft 22 mounted in the frame, the outer end of said shaft being provided with a suitable handle 23 for turning the same. One arm of the bell-crank lever 21, the end of which is preferably beveled in both directions, as shown in Figs. 5 and 6, is arranged to bear upon the tail of the pivoted pawl 20, as shown in Fig. 3, and is kept in this position normally by a spring-plunger 24 mounted in the frame of the machine and arranged to act against the other arm of said bell-crank lever, as shown in Fig. 4. Another spring-plunger 25 is mounted in the disk 19 with its end arranged to act against a pin or stud projecting laterally from the tail of the pawl 20, said spring-plunger 25 serving to throw said pawl into engagement with the ratchet-wheel 18 whenever the arm of the bell-crank lever is removed from in front of the tail of said pawl.

As long as the bell-crank lever 21 is left in its normal position the pawl 20 is kept out of engagement with the ratchet-wheel, and consequently the cam-shaft 3 remains at rest. Whenever it is desired, however, to throw the cam-shaft into operation, this may be done by the operator's simply depressing the handle 23 a short distance, which will have the effect to remove the arm of the bell-crank lever 21 from in front of the tail of the pawl 20, and thus permit said pawl to be thrown into engagement with the ratchet-wheel 18 under the action of the spring-plunger 25, thereby causing the disk 19 and the cam-shaft 3 to be revolved with the gear 17. As the opposite arm of the bell-crank lever is acted upon by the spring-plunger 24, said lever will be promptly and automatically returned to its normal position. As it is only necessary to give to the cam-shaft a single revolution to effect the various operations of releasing the gripping-jaws in the chuck, feeding forward the rod of stock, again closing said gripping-jaws, and moving back the feeding devices for taking a new grip upon the rod of stock, the handle 23 does not require to be held depressed for any length of time, but is simply depressed to undog the spring-plunger 25 and immediately released and returned to its normal position under the action of the spring-plunger 24. Thus only a very simple and quickly-effected manipulation on the part of the operator is required to throw the cam-shaft into operation.

The bell-crank lever having been thus returned to its normal position and into the path of the tail of the pawl 20 as the latter is carried around with the disk 19 in the revolution of the cam-shaft, the tail of said pawl will be gradually depressed by the beveled end of the arm of said bell-crank lever and finally thrown out of engagement with the ratchet-wheel and into the position shown in Fig. 3, thereby automatically disconnecting the cam-shaft from the gear 17, and thus from the spindle 1, and throwing said cam-shaft out of operation, such disengagement of said pawl being effected when the cam-shaft has made a complete revolution. A spring-actuated detent 26, mounted in the frame and provided with beveled faces, is arranged to engage a recess or depression in the face of the disk 19 and serves to hold said disk in its stationary position, said detent yielding, however, and riding out of the depression in the face of said disk when the pawl is engaged with the ratchet-wheel to rotate said disk and cam-shaft.

It will be seen that by the combination and arrangement of parts above described the cam-shaft which actuates and controls the operation of the gripping-jaws of the chuck and the feeding devices is operated directly from the chuck-carrying spindle itself. It will further be seen that said cam-shaft is thrown into operation by a simple manipulation on the part of the operator and thrown out of operation automatically. In forming screws upon such a machine from a rod of stock whenever the operator desires to have the jaws of the chuck operated and the rod of stock fed he has simply to depress the handle 23 and immediately release it, whereupon the cam-shaft will be thrown into operation, the desired operations will be automatically performed, and when completed the cam-shaft will be automatically thrown out of operation.

Any desired form of chuck and chuck-operating mechanism may be connected with the hollow spindle 1 and operated by the lever 9 under the influence of the cam 5 on the cam-shaft. I prefer, however, to employ the novel arrangement of chuck and means for actuating the jaws thereof which constitute a further feature of the present invention, and which will now be described.

The end of the hollow spindle 1 is enlarged in diameter and chambered out to receive the chuck 27 and its inclosing sleeve 28. The chuck 27 is provided with the gripping-jaws 29, which are preferably spring-jaws, said jaws being provided with beveled or inclined outer faces to co-operate with the inclined or conical inner face of the sleeve 28. The chuck 27 is inserted in the sleeve 28, the inner end of said chuck abutting against a spiral spring 30, which is inserted in the bore of said sleeve and which in turn abuts against an internal annular shoulder 31 on said sleeve. The combined chuck and sleeve are then inserted in the chambered end of the hollow spindle 1 and are held in place therein by the cap 32, which is screwed onto the end of said spindle and which bears against an annular flange 33, formed on the chuck 27. Said chuck is thus positively held against movement in one direction and is held against movement in the opposite direction by means of the spring 30.

In the construction above described the jaws 29 are actuated to grip and release the rod of stock by moving the sleeve 28 longitudinally with relation to the chuck 27, such movement of said sleeve in one direction serving to force the jaws inward to grip the rod and the movement of said sleeve in the opposite direction serving to release said jaws. The mechanism for moving said sleeve 28 to thus actuate the jaws 29 is as follows: An adjustable collar 34 is screwed upon the spindle 1 to form a fulcrum or bearing for the short arms of two or more bent levers 35, which said levers are loosely arranged in suitable grooves or slots 36 formed in said spindle, with the angle of each of said levers bearing against the end of the chuck-sleeve 28, as shown in Fig. 2. Preferably a hardened steel collar 37 is inserted between said adjustable collar 34 and the ends of the levers 35 to take the wear, said collar being preferably held from turning on the spindle. Surrounding the collars 34 and 37 and the levers 35 is the sliding sleeve 8, which likewise revolves with the spindle, said sleeve being slotted to receive the ends of said levers 35, the end of each of said slots being beveled, as at 38, to engage and act upon the corresponding inclined or cam face 39 upon the end of each of said levers. Said sleeve 8 is provided with an exterior annular groove to receive the ring 40, with which said ring the lever 9 is connected. By this construction, as will be seen, when the lever 9 is moved in one direction by the cam 5 the sliding sleeve 8 will be moved to the left in Fig. 2, which movement of said sleeve will have the effect to force inward the ends of the long arms of the levers 35, thereby causing said levers to turn upon their fulcrums and force the chuck-sleeve 28 to the right in said figure, such movement of the chuck-sleeve serving to force inward the jaws 29 of the chuck and cause them to grip and firmly hold the rod of stock while it is being operated upon. When said chuck-sleeve 28 is thus moved in the direction referred to, the spiral spring 30 will be compressed, and when the sliding sleeve 8 is moved back—that is, to the right in Fig. 2, under the action of the cam 5 and lever 9, and so as to release the ends of the long arms of levers 35—said spring will serve to return said levers and the chuck-sleeve 28 to their normal position, thereby releasing the jaws 29. Said spring 30 may be and preferably is adjusted so as to normally hold the end of the chuck-sleeve 28 in contact with its operating-levers 35, so as to avoid any lost motion.

It will thus be seen that with the construction and arrangement shown and described the jaws of the chuck are operated to grip and release the rod of stock, not by a longitudinal movement of said chuck with relation to its inclosing-sleeve, but instead by a longitudinal movement of said inclosing-sleeve with relation to the chuck, and it will be readily understood how such construction and arrangement overcome and avoid the objections and disadvantages attending the old method of operating said jaws.

Any suitable mechanism may be substituted for that above described for giving the proper longitudinal movement to the sleeve 28 with relation to the chuck 27, the gist of this feature of invention consisting in giving to said sleeve a movement relatively to said chuck to actuate the gripping-jaws. It will be further understood that this feature of invention may be employed irrespective of whether the cam-shaft is operated directly from the spindle or otherwise, and that, on the other hand, that feature of the invention which consists in operating the cam-shaft directly from the spindle may be employed in connection with any form of chuck or any form of mechanism or devices for actuating the jaws thereof.

What I claim as my invention, and desire to secure by Letters Patent, is—

1. The combination with a spindle carrying a chuck containing gripping jaws and means for rotating the same, of a cam-shaft provided with a cam for actuating the jaws of said chuck, and mechanism substantially as described, connecting said cam-shaft with said spindle, whereby said cam-shaft will be operated directly from said spindle.

2. The combination, with a hollow spindle carrying a chuck containing gripping jaws, means for rotating the same, and devices for feeding a rod of stock through said spindle and chuck, of a cam-shaft provided with a cam for actuating said feeding devices, and mechanism substantially as described, connecting said cam-shaft with said spindle, whereby said cam-shaft will be operated directly from said spindle.

3. The combination, with a hollow spindle carrying a chuck containing gripping jaws, means for rotating the same, and devices for feeding a rod of stock through said spindle and chuck, of a cam-shaft provided with cams for actuating the jaws of said chuck and said feeding devices, and mechanism substantially as described, connecting said cam-shaft with said spindle, whereby said cam-shaft will be operated directly from said spindle.

4. The combination, with a hollow spindle carrying a chuck containing gripping jaws, means for rotating the same, and devices for feeding a rod of stock through said spindle and chuck, of a cam-shaft provided with suitable cams for actuating the jaws of said chuck and said feeding devices, mechanism for operating said cam-shaft direct from said spindle, and means for connecting said cam-shaft with, and disconnecting it from, said spindle, whereby said cam-shaft may be operated intermittently, substantially as described.

5. The combination, with a hollow spindle carrying a chuck containing gripping jaws, means for rotating the same, and devices for feeding a rod of stock through said spindle and chuck, of a cam-shaft provided with suitable cams for actuating the jaws of said chuck and said feeding devices at the proper times, mechanism for operating said cam-shaft direct from said spindle, means for enabling said cam-shaft to be connected with said spindle, and means for automatically disconnecting said cam-shaft from said spindle, substantially as described.

6. The combination, with a hollow spindle, and means for rotating the same, of a cam-shaft, a train of gearing between said spindle and said cam-shaft, said train terminating in a gear loosely mounted on said cam-shaft, a ratchet-wheel secured to said gear, a pawl connected with said cam-shaft and adapted to engage the teeth of said ratchet wheel, means for normally holding said pawl out of engagement with said ratchet wheel, and means for tripping said pawl and permitting it to engage said ratchet wheel, and thus connect said cam-shaft to said spindle, substantially as described.

7. The combination, with a hollow spindle, and means for rotating the same, of a cam-shaft, a train of gearing between said spindle and said cam-shaft, said train terminating in a gear loosely mounted on said cam-shaft, a ratchet-wheel secured to said gear, a pawl connected with said cam-shaft and adapted to engage said ratchet wheel, means for normally holding said pawl out of engagement with said ratchet wheel, means for tripping said pawl and permitting it to engage said ratchet wheel, and means for automatically disengaging said pawl from said ratchet-wheel, substantially as described.

8. The combination, with a hollow spindle and means for rotating the same, of a chuck containing gripping jaws, an inclosing sleeve for actuating said jaws, a positive abutment for the outer end of said chuck, a spring interposed between the inner end of said chuck and said inclosing sleeve, and means for giving to said sleeve a longitudinal movement with relation to said chuck to actuate the gripping jaws therein, substantially as described.

SAMUEL L. WORSLEY.

Witnesses:
W. H. THURSTON,
S. J. MURPHY.